(12) United States Patent
Tsirkin et al.

(10) Patent No.: US 10,055,136 B2
(45) Date of Patent: Aug. 21, 2018

(54) MAINTAINING GUEST INPUT/OUTPUT TABLES IN SWAPPABLE MEMORY

(71) Applicant: Red Hat Israel, Ltd., Raanana (IL)

(72) Inventors: Michael Tsirkin, Yokneam Yillit (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 91 days.

(21) Appl. No.: 14/812,669

(22) Filed: Jul. 29, 2015

(65) Prior Publication Data

US 2017/0031593 A1    Feb. 2, 2017

(51) Int. Cl.
*G06F 3/06* (2006.01)
*G06F 9/455* (2018.01)

(52) U.S. Cl.
CPC ............ *G06F 3/061* (2013.01); *G06F 3/0631* (2013.01); *G06F 3/0638* (2013.01); *G06F 3/0667* (2013.01); *G06F 3/0683* (2013.01); *G06F 9/45558* (2013.01); *G06F 2009/45579* (2013.01); *G06F 2009/45583* (2013.01)

(58) Field of Classification Search
CPC .............................. G06F 3/061; G06F 3/0631
See application file for complete search history.

(56) References Cited

U.S. PATENT DOCUMENTS

| | | | |
|---|---|---|---|
| 7,783,856 B2 * | 8/2010 | Hashimoto | G06F 9/5077 711/173 |
| 7,783,858 B2 | 8/2010 | Chiang et al. | |
| 7,853,825 B2 * | 12/2010 | Varadarajan | G06F 11/1438 714/10 |
| 7,904,692 B2 * | 3/2011 | Mukherjee | G06F 12/1081 711/203 |
| 8,392,628 B2 * | 3/2013 | Santos | G06F 12/1081 710/22 |
| 8,516,479 B2 * | 8/2013 | Hattori | G06F 9/45558 718/1 |
| 8,631,170 B2 * | 1/2014 | Tsirkin | G06F 9/45558 710/22 |

(Continued)

OTHER PUBLICATIONS

Amit, Nadav et al., "vIOMMU: Eficient IOMMU Emulation", Technion & IBM Research, 14 Pages http://www.mulix.org/pubs/iommu/viommu.pdf (Last accessed May 15, 2015).

(Continued)

*Primary Examiner* — Charles Rones
*Assistant Examiner* — Tian-Pong Chang
(74) *Attorney, Agent, or Firm* — Lowenstein Sandler LLP

(57) ABSTRACT

Systems and methods for maintaining guest input/output (I/O) tables in a swappable memory. An example method comprises: allocating, by a hypervisor running on a host computer system, one or more memory pages mapped into a memory space of a virtual machine running on the host computer system, to store a guest input/output (I/O) table comprising a plurality of I/O table entries, wherein each I/O table entry maps a device identifier of an I/O device to a memory address of a memory buffer associated with the I/O device; determining, by a processing device of the host computer system, that a memory page comprises one or more I/O table entries that reference memory buffers that are marked as being not accessible by associated I/O devices; and swapping out the memory page to a backing storage.

20 Claims, 4 Drawing Sheets

(56) References Cited

U.S. PATENT DOCUMENTS

| | | | |
|---|---|---|---|
| 8,631,212 B2 | 1/2014 | Kegel et al. | |
| 8,635,430 B2 | 1/2014 | Craddock et al. | |
| 8,719,464 B2 * | 5/2014 | Kegel | G06F 13/28 710/22 |
| 8,788,739 B2 | 7/2014 | Chang et al. | |
| 8,914,458 B2 * | 12/2014 | Raindel | G06F 3/061 709/212 |
| 8,924,684 B1 | 12/2014 | Vincent | |
| 2010/0318762 A1 * | 12/2010 | Malyugin | G06F 12/1027 711/207 |
| 2012/0272037 A1 | 10/2012 | Bayer et al. | |
| 2014/0281333 A1 | 9/2014 | Peterson et al. | |
| 2015/0058577 A1 | 2/2015 | Earl | |

OTHER PUBLICATIONS

Ben-Yehuda, Muli et al., "Utilizing IOMMUs for Virtualization in Linux and Xen", ibm.com; intel.com; amd.com, 2012, 15 pages http://developer.amd.com/wordpress/media/2012/10/IOMMU-ben-yehuda.pdf.

"Re: [LSF/MM Topic] Hardware initiated paging of user process pages, hardware access", linux-mm, 2012, 5 pages http://marc.info/?I=linux-mm&m=136048296117904&w=2.

\* cited by examiner

MAINTAINING GUEST INPUT/OUTPUT TABLES IN SWAPPABLE MEMORY

TECHNICAL FIELD

The present disclosure is generally related to virtualized computer systems, and is more specifically related to systems and methods for facilitating Direct Memory Access (DMA) operations.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
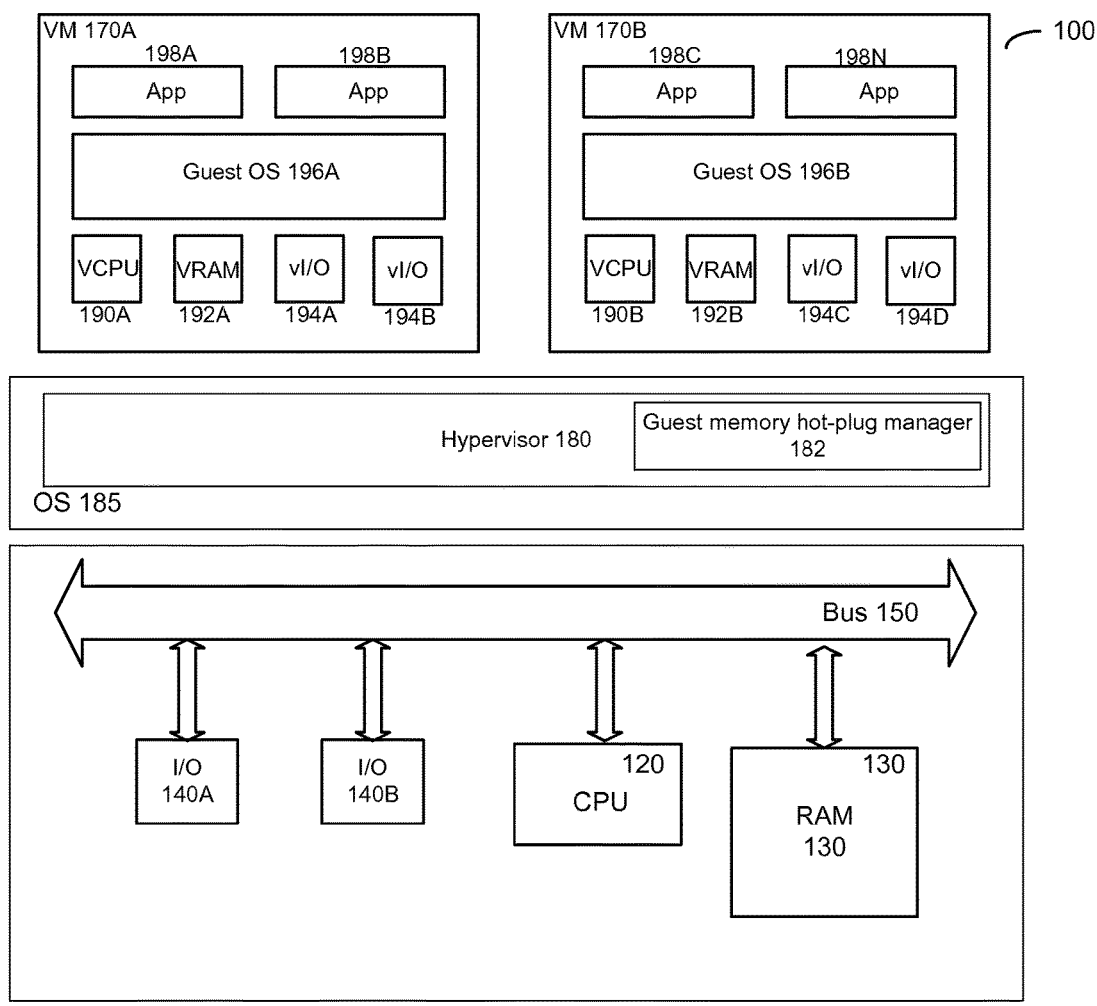
FIG. 1 depicts a high-level component diagram of an example computer system implementing the methods for maintaining guest input/output (I/O) tables in a swappable memory, in accordance with one or more aspects of the present disclosure.

Described herein are methods and systems for maintaining guest input/output (I/O) tables in a swappable memory.

Direct Memory Access (DMA) herein refers to a method allowing an I/O device to access the system memory directly, while bypassing the central processing unit (CPU). I/O devices that are capable of performing DMA include disk drive controllers, graphics cards, network interface cards, sound cards, etc.

A host computer system may support a virtual memory environment in which the memory space of a virtual machine may be divided into memory pages that may be allocated in the host RAM and swapped to the backing storage when necessary.

In certain implementations, the host computer system may emulate Direct Memory Access (DMA) to allow virtual I/O devices to access the guest memory directly, while bypassing the guest central processing units (CPUs). A hypervisor running on the host computer system may emulate a guest I/O table (e.g., a guest IOMMU) to manage address translations for DMA-enabled virtual I/O devices. Each entry of the guest I/O table may map a virtual device identifier (comprising an I/O bus identifier and a device address) to a guest physical address of the memory buffer that has been allocated to the device by the guest operating system. In various illustrative examples, each guest I/O table entry may further comprise access permissions associated with the memory buffer.

In certain implementations, in order to allow high-priority tasks and interrupt service routines to use a guest I/O table, such a table should reside (or at least be shadowed) in an un-swappable hypervisor memory. On the other hand, for more efficient address translation, guest I/O tables should have a simple linear data structure which leads to a significantly larger table sizes, thus requiring the hypervisor to pin (i.e., make un-swappable) large amounts of the system memory.

Aspects of the present disclosure address the above noted and other deficiencies by providing methods and systems for maintaining guest input/output (I/O) tables in a swappable memory. In accordance with one or more aspects of the present disclosure, one or more memory pages may be allocated for storing a guest I/O table in the guest swappable memory. The guest operating system may maintain, in the guest I/O table, a plurality of records mapping I/O device identifiers (e.g., represented by an I/O bus identifier and a device address on the I/O bus) to respective guest physical addresses of memory buffers associated with the I/O devices.

The hypervisor may limit swapping out of the memory pages in which guest I/O tables reside to swapping out memory pages only comprising guest I/O table entries that reference memory buffers that are marked as being not accessible by I/O devices (e.g., non-present memory buffers). Responsive to eventually detecting an attempt to access a swapped out memory page that comprises an I/O table record, the hypervisor may swap the memory page in (e.g., by performing a call to get_user_pages routine).

Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more applications 198A-198N may be running on a virtual machine 170 under a guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary. Computer system 100 may support a virtual memory environment in which a virtual machine address space is simulated with a smaller amount of the host random access memory (RAM) and a backing storage (e.g., a file on a disk or a raw storage device), thus allowing the host to over-commit the memory. The virtual machine memory space may be divided into memory pages which may be allocated in the host RAM and swapped to the backing storage when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing storage and continue executing the virtual machine that caused the exception.

In certain implementations, the host computer system may emulate Direct Memory Access (DMA) to allow virtual I/O devices to access the guest memory directly, while bypassing the guest central processing units (CPUs). A hypervisor running on the host computer system may emulate a guest I/O table (e.g., a guest IOMMU) to manage address translations for DMA-enabled virtual I/O devices. The guest IOMMU may map a virtual device identifier (comprising an I/O bus identifier and a device address) to a guest physical address of the memory buffer that has been allocated to the device by the guest operating system.

Guest I/O table manager component 182 running on host computer system 100 may perform various DMA functions in accordance with one or more aspects of the present disclosure. In certain implementations, guest I/O table manager component 182 may be implemented as a software component invoked by hypervisor 180. Alternatively, functions of guest I/O table manager component 182 may be performed by hypervisor 180.

Figure 2:
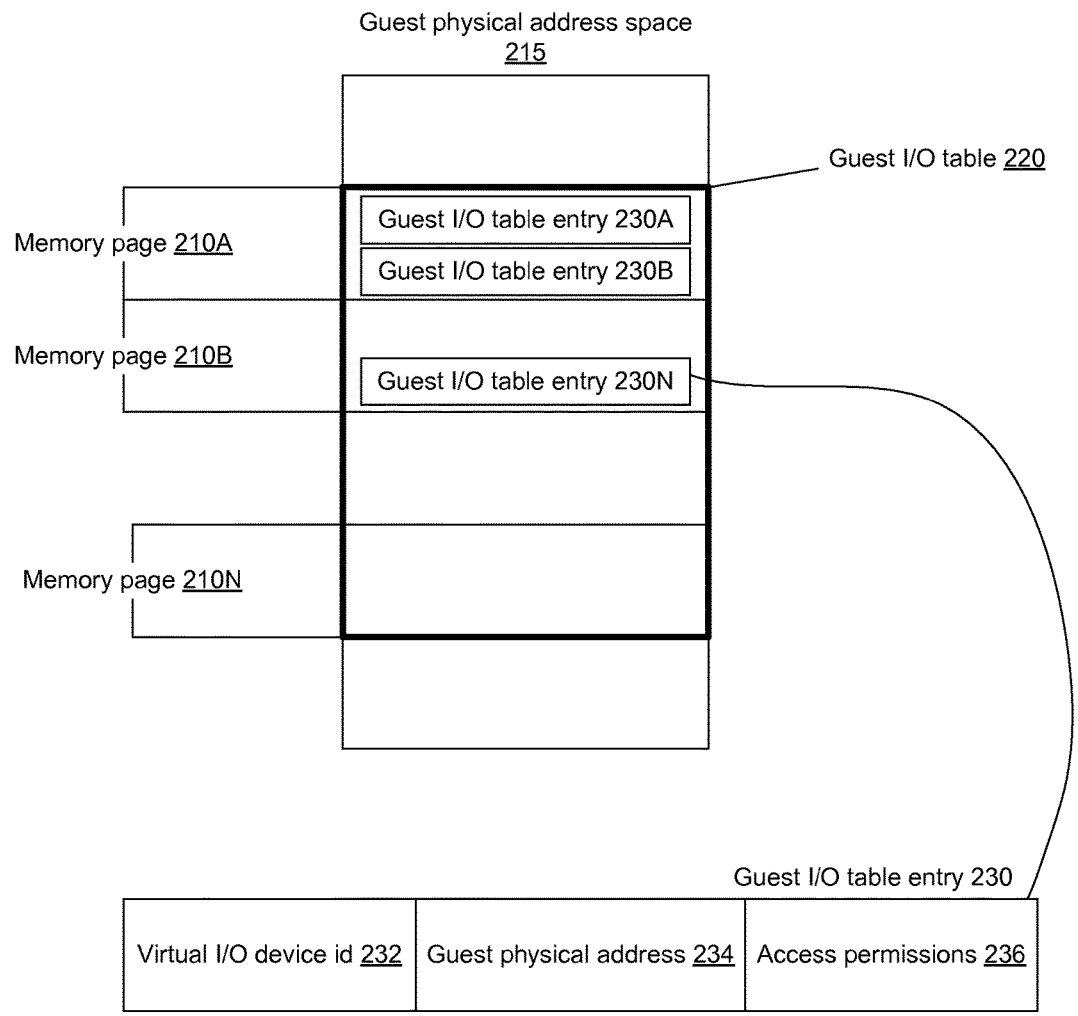
FIG. 2 schematically illustrates an example of guest I/O table residing in the guest swappable memory, in accordance with one or more aspects of the present disclosure.

FIG. 2 schematically illustrates an example of guest I/O table residing in the guest swappable memory, in accordance with one or more aspects of the present disclosure. As schematically illustrated by FIG. 2, the hypervisor may allocate a plurality of memory pages 210A-210N residing in the guest memory 215 to store a guest I/O table 220. In an illustrative example, guest I/O table 220 may be represented by an emulated IOMMU.

Guest I/O tables may comprise a plurality of I/O table entries 230A-230N. A guest table entry 230 may map a virtual I/O device identifier 232 to a guest physical address 234 of the buffer associated with the I/O device. In certain implementations, guest table entry 230 may further comprise access permissions 236 associated with the memory buffer.

Memory pages allocated to store a guest I/O table do not need to be pinned by the guest operating system, as they cannot be the target of a guest I/O operation or a DMA operation, and hence such memory pages may be swapped out by the hypervisor to a backing storage.

A guest I/O table entry that reference a memory buffers that are marked as being accessible by I/O devices may be accessed from an interrupt context and/or from a high-priority task context at any time. Hence, hypervisor 180 may limit swapping out of the memory pages in which guest I/O tables reside to only swapping out memory pages that do not comprise any guest I/O table entries that reference memory buffers that are marked as being accessible by I/O devices, or, in other words, memory pages that only comprising guest I/O table entries that reference memory buffers that are marked as being not accessible by I/O devices (e.g., non-present memory buffers).

In certain implementations, hypervisor 180 may maintain a memory data structure to store a plurality of reverse mappings of host addresses to the guest addresses of the memory pages allocated to a guest I/O table. Hypervisor may employ the memory data structure to determine that a certain memory page comprises I/O table entries that reference memory buffers that are marked as being not accessible the by associated I/O devices.

Responsive to determining that a memory page comprises one or more I/O table entries that reference memory buffers that are marked as being not accessible by associated I/O devices, hypervisor 180 may swap out the memory page to a backing storage. As the memory page has been determined to be not accessible by the associated I/O devices, swapping the memory page out would not adversely affect the overall system performance.

Hypervisor 180 may eventually verify the access to a given memory address by a certain I/O device (e.g., to determine, on behalf of the I/O device whether the memory address would require a privileged access). Responsive to determining that the memory page comprising the memory buffer is not present (i.e., has been swapped out), hypervisor 180 may determine that such access is forbidden.

Responsive to eventually detecting an attempt to access a swapped out memory page that comprises an I/O table record, hypervisor 180 may swap the memory page in (e.g., by performing a call to get_user_pages routine).

Figure 3:
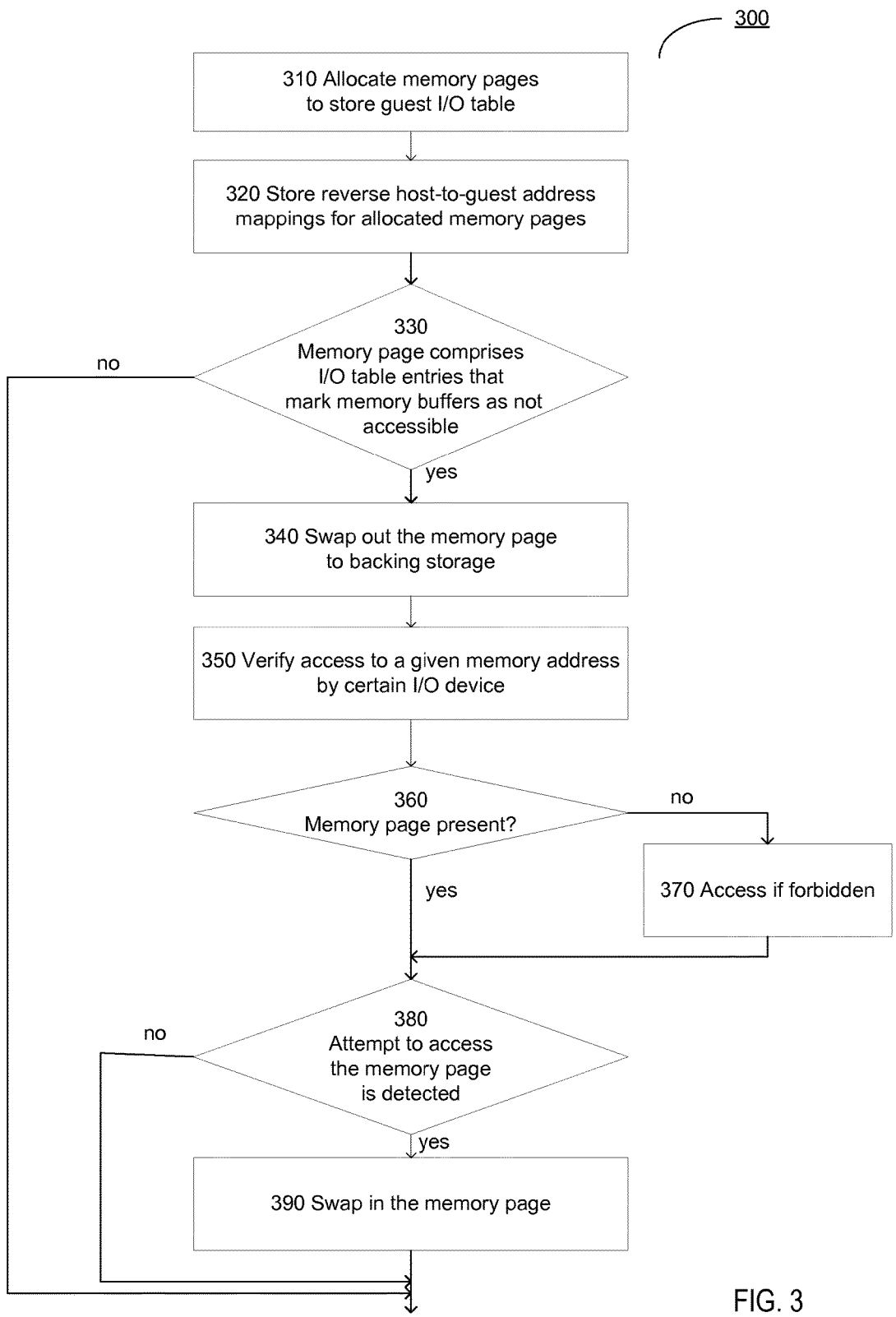
FIG. 3 depicts a flow diagram of a method for maintaining guest input/output (I/O) tables in a swappable memory, in accordance with one or more aspects of the present disclosure.

FIG. 3 depicts a flow diagram of one illustrative example of a method 300 for maintaining guest input/output (I/O) tables in a swappable memory, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a host computer system implementing the method may allocate one or more memory pages mapped into the memory space of a virtual machine running on the host computer system, to store a guest input/output (I/O) table. Each entry of the guest I/O table may map a device identifier of a virtual I/O device to a memory address of a memory buffer associated with the I/O device. In certain implementations, the guest I/O table may be represented by an emulated guest IOMMU. In an illustrative example, the memory address may be represented by a guest physical address within the address space of the virtual machine. The I/O device identifier may comprise a bus identifier and/or a device bus address, as described in more details herein above.

At block 320, the processing device may store, in a memory data structure residing in the hypervisor memory, a plurality of reverse mappings of host addresses to the guest addresses of the memory pages allocated to a guest I/O table.

Responsive to determining, at block 330, in view of the plurality of reverse mappings, that a memory page comprises one or more I/O table entries that reference memory buffers that are marked as being not accessible by associated I/O devices, the processing device may, at block 340, swap out the memory page to a backing storage, as described in more details herein above.

At block 350, the processing device may verify the access to a given memory address by a certain I/O device (e.g., to determine, on behalf of the I/O device whether the memory address would require a privileged access). Responsive to determining, at block 360, that the memory page comprising the memory buffer is not present (i.e., has been swapped out), the processing device may, at block 370, determine that such access is forbidden.

Responsive to detecting, at block 380, an attempt to access the memory page, the processing device may, at block 390, swap the page in (e.g., by performing a call to get_user_pages routine). Upon completing the operations referenced by block 390, the method may terminate.

Figure 4:
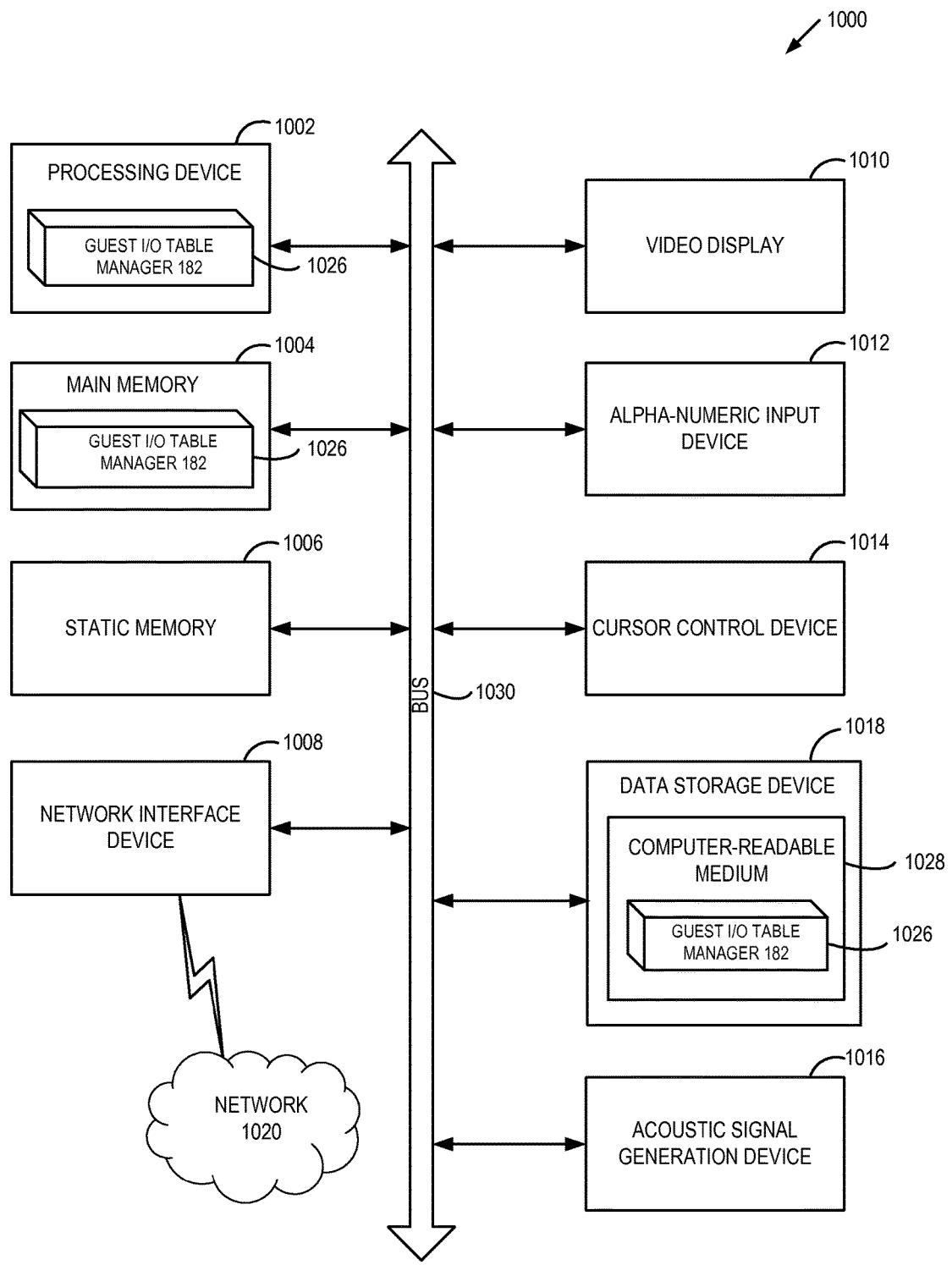
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute guest I/O table manager component 182 implementing method 300 for maintaining guest input/output (I/O) tables in a swappable memory.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of guest I/O table manager component 182 implementing method 300 for maintaining guest input/output (I/O) tables in a swappable memory.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   allocating, by a processing device of a host computer system, one or more memory pages mapped into a memory space of a virtual machine running on the host computer system, to store a guest input/output (I/O) table comprising a plurality of I/O table entries, wherein each I/O table entry maps a device identifier of an I/O device to a memory address of a memory buffer associated with the I/O device;
   storing a plurality of reverse mappings of host memory addresses to guest addresses for the memory pages allocated to store the guest I/O table;
   determining, in view of the plurality of reverse mappings, that a memory page comprises only I/O table entries that reference memory buffers that are marked as being not accessible by associated I/O devices; and
   swapping out the memory page to a backing storage.

2. The method of claim 1, further comprising:
   responsive to detecting an attempt to access the memory page that comprises the I/O table entries, swapping in the memory page.

3. The method of claim 1, wherein the I/O table is represented by an Input/Output Memory Management Unit (IOMMU) table.

4. The method of claim 1, wherein the I/O device identifier comprises at least one of a bus identifier or a bus address.

5. The method of claim 1, wherein the memory address of the memory buffer associated with the I/O device is represented by a guest physical address within the memory space of the virtual machine.

6. The method of claim 1, wherein the I/O device is represented by a virtual I/O device associated with the virtual machine.

7. The method of claim 1, further comprising:
   verifying access to a memory buffer associated with an I/O device;
   responsive to determining that a memory page comprising the memory buffer is not present, determining that the access is forbidden.

8. A computer system comprising:
   a memory; and
   a processing device, operatively coupled to the memory, to:

allocate one or more memory pages mapped into a memory space of a virtual machine running on the computer system, to store a guest input/output (I/O) table comprising a plurality of I/O table entries, wherein each I/O table entry maps a device identifier of an I/O device to a memory address of a memory buffer associated with the I/O device;

store a plurality of reverse mappings of host memory addresses to guest addresses for the memory pages allocated to store the guest I/O table;

determine, in view of the plurality of reverse mappings, that a memory page comprises only I/O table entries that reference memory buffers that are marked as being not accessible by associated I/O devices; and swap out the memory page to a backing storage.

9. The system of claim 8, wherein the processing device is further to:

responsive to detecting an attempt to access the memory page that comprises the I/O table entries, swap in the memory page.

10. The system of claim 8, wherein the I/O table is represented by an Input/Output Memory Management Unit (IOMMU) table.

11. The system of claim 8, wherein the I/O device identifier comprises at least one of a bus identifier or a bus address.

12. The system of claim 8, wherein the memory address of the memory buffer associated with the I/O device is represented by a guest physical address within the memory space of the virtual machine.

13. The system of claim 8, wherein the I/O device is represented by a virtual I/O device associated with the virtual machine.

14. The system of claim 8, wherein the processing device is further to:

verify access to a memory buffer associated with an I/O device;

responsive to determining that a memory page comprising the memory buffer is not present, determine that the access is forbidden.

15. A computer-readable non-transitory storage medium comprising executable instructions to cause a processing device to:

allocate one or more memory pages mapped into a memory space of a virtual machine running on a host computer system, to store a guest input/output (I/O) table comprising a plurality of I/O table entries, wherein each I/O table entry maps a device identifier of an I/O device to a memory address of a memory buffer associated with the I/O device;

store a plurality of reverse mappings of host memory addresses to guest addresses for the memory pages allocated to store the guest I/O table;

determine, in view of the plurality of reverse mappings, that a memory page comprises only I/O table entries that reference memory buffers that are marked as being not accessible by associated I/O devices; and swap out the memory page to a backing storage.

16. The computer-readable non-transitory storage medium of claim 15, further comprising executable instructions to cause the processing device to:

responsive to detecting an attempt to access the memory page that comprises the I/O table entries, swap in the memory page.

17. The computer-readable non-transitory storage medium of claim 15, wherein the I/O table is represented by an Input/Output Memory Management Unit (IOMMU) table.

18. The computer-readable non-transitory storage medium of claim 15, wherein the memory address of the memory buffer associated with the I/O device is represented by a guest physical address within the memory space of the virtual machine.

19. The computer-readable non-transitory storage medium of claim 15, wherein the I/O device is represented by a virtual I/O device associated with the virtual machine.

20. The computer-readable non-transitory storage medium of claim 15, further comprising executable instructions to cause the processing device to:

verify access to a memory buffer associated with an I/O device;

responsive to determining that a memory page comprising the memory buffer is not present, determine that the access is forbidden.

* * * * *